March 24, 1936.  C. L. BROCKWAY  2,034,971
KEEPER
Filed March 2, 1934
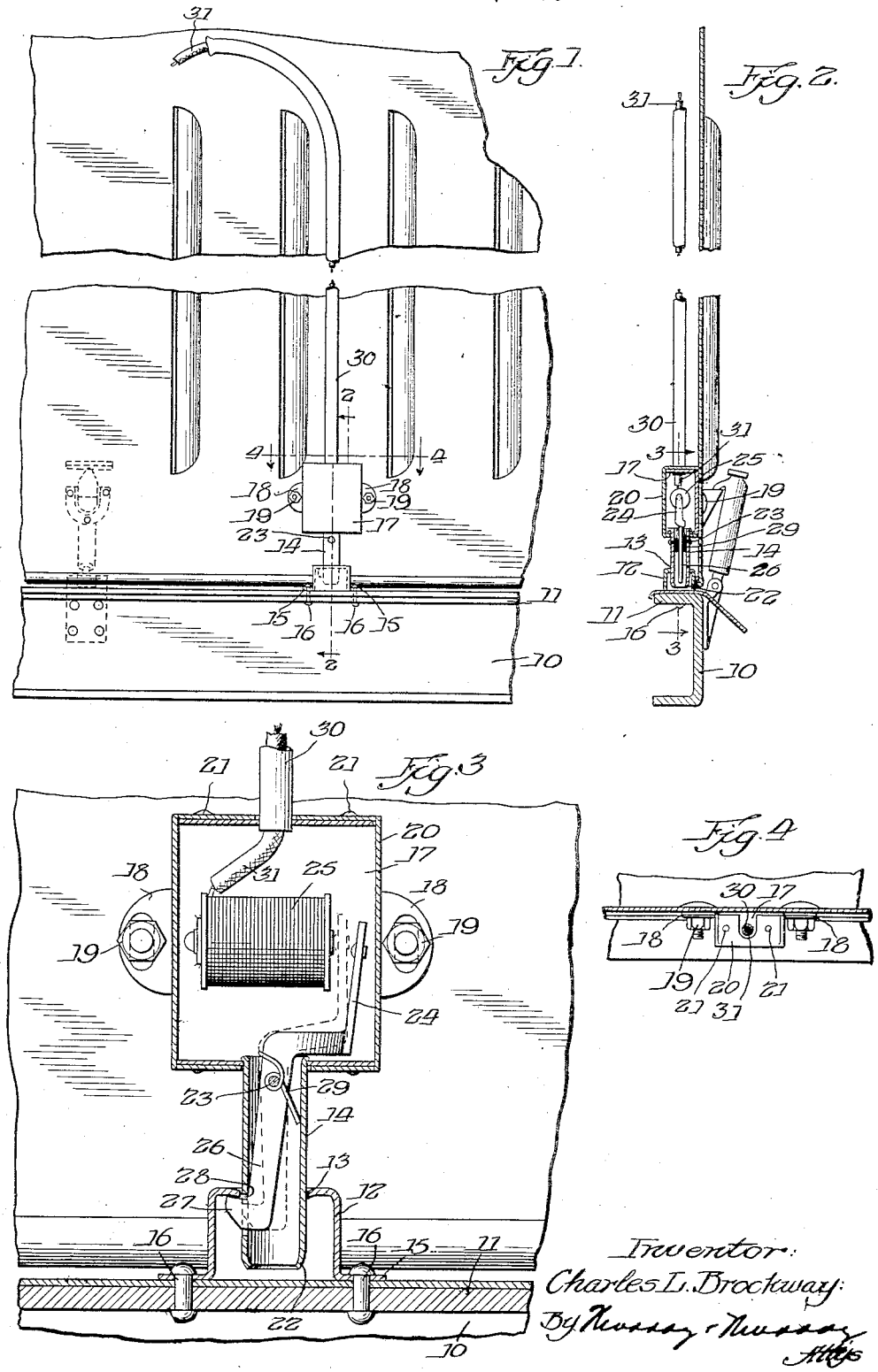
Inventor:
Charles L. Brockway Patented Mar. 24, 1936

2,034,971

UNITED STATES PATENT OFFICE 2,034,971

KEEPER

Charles L. Brockway, Chicago, Ill.

Application March 2, 1934, Serial No. 713,734

2 Claims. (Cl. 292—340)

My invention relates to locking mechanism, and particularly to such mechanism as applied to the hoods or engine covers of automobiles.

An object of my invention is to provide simple and effective locking means that may easily be applied to any standard automobile in a few moments time and when applied will serve to effectively lock the hood against tampering. The desirability for this provision will be readily understood without a detailed explanation.

A particular object of the improvement is to provide a locking mechanism so arranged that no weakening of the automobile frame is necessary such as occurs when a relatively large hole must be drilled through the flange of the frame for engagement by the locking bolt. Furthermore, by reason of the construction shown herein, the bolt or locking element is wholly encased and cannot be operated by reaching underneath the frame.

The invention will be more readily understood by reference to the accompanying drawing, in which:

Fig. 1 is a fragmentary side elevation showing a part of an automobile hood and the frame member on which the hood rests and to which it is secured;

Fig. 2 is a sectional view taken on the line 2—2 of Fig. 1;

Fig. 3 is an enlarged sectional view on the line 3—3 of Fig. 2, and

Fig. 4 is a sectional view on the line 4—4 of Fig. 1.

In the drawing I have illustrated a channel-shaped frame member 10 upon the upper flange 11 of which is mounted a flanged cup 12. The upper wall 12ᵃ of the cup contains an opening 13 for the reception of the hollow bolt 14 of the locking mechanism, the stock about the opening being somewhat depressed and the flange 15 of the cup constituting the means by which the keeper or cup is secured to the frame 11 by means of the rivets 16.

The locking mechanism comprises a two-part box, the main part 17 having ears 18 containing vertically elongated holes by which it is secured to the inside of the hood through the bolts and nuts 19. The elongated openings permit of any desired adjustment in order to secure proper engagement of the bolt and socket. The open side of the box is closed by means of a cap or cover 20, the two ends of which are resilient and have a snap fit with the corresponding ends of the main part through the engaging projections and recess 21.

The bolt 14 is in the form of a tube that is permanently attached by crimping of the end that projects into the body portion 17 of the box, the lower end 22 being tapered to facilitate its entrance into the opening 13 in the keeper. A locking arm or latch is pivoted on a cross pin 23, the element being in the form of a rocker, the upper end 24 of which constitutes the armature of the magnet 25, while the lower end 26 has a lateral projection or head 27 that extends through an opening 28 in the side of the bolt and projects beneath the upper wall of the keeper 12. The latter by its incline locks the latch head in the manner of a hook. The cross pin is preferably located in the bolt at a point near the junction of the bolt and box. A spring 29 tends to hold the head 27 in locking position. A tube 30 which may be rigid or flexible extends from the upper wall of the box to a point near the hinge or pivot point of the hood member and a wire or wires 31 extend through the tube and are connected to the magnet. The wires may be connected to a locked switch in the driver's compartment and to a source of electrical power in such manner that when the switch is closed the magnet is energized, the armature is brought into contact therewith and the lock withdrawn from beneath the locking projection 12ᵃ. The arrangement is such that the lock can be actuated only when the switch is closed and thus any cutting of the wires will defeat any attempt to operate the lock.

It will be noted that the locking element is not only within the hood but is also entirely encased within a riveted receptacle thus rendering it impossible to secure access to the locking element from any point outside of the engine hood.

It will be understood that while I have shown electrical means for actuating the latch or lock element, I also contemplate the use of mechanical means for this purpose, any mechanical connection being suitably armored and extending to a lock readily available to the driver.

I claim:

1. A keeper for a horizontally pivoted latch having a laterally extended head at the bottom comprising, an arched member having a perforation in its top through which the latch head depends, that portion of said top which is adjacent the perforation being inclined toward the latch head, whereby to serve as a hook when engaged by the extended portion of the head on the upward swing of the latch toward said portion.

2. A keeper for a horizontally pivoted latch having a laterally extended head at the bottom comprising, an inverted cup having a central perforation in its top through which the latch head depends, that portion of said top which surrounds the perforation being inclined inwardly whereby to serve as a hook when engaged by the extended portion of the head on the upward swing of the latch toward said portion.

CHARLES L. BROCKWAY.